US005588679A

United States Patent [19]

Skov et al.

[11] Patent Number: 5,588,679

[45] Date of Patent: Dec. 31, 1996

[54] TAMPER RESISTANT LABELING

[75] Inventors: Richard T. Skov, Spencer; John R. Pennace, Paxton, both of Mass.

[73] Assignee: FLEXcon Company, Inc., Spencer, Mass.

[21] Appl. No.: 479,553

[22] Filed: Jun. 7, 1995

Related U.S. Application Data

[63] Continuation of Ser. No. 875,552, Apr. 24, 1992, abandoned, which is a continuation of Ser. No. 162,239, Feb. 29, 1988, abandoned, which is a division of Ser. No. 941,998, Dec. 15, 1986, abandoned.

[51] Int. Cl.$^{6}$ .............................. B42D 15/00; B32B 7/10

[52] U.S. Cl. ................................ 283/67; 283/81; 283/94; 283/101; 283/901

[58] Field of Search ............................ 156/52, 157, 279, 156/344; 283/35, 36, 37, 41, 72, 75, 81, 91, 108, 67, 94, 101, 901; 422/907; 427/7, 535, 536, 539; 430/937

[56] References Cited

U.S. PATENT DOCUMENTS

| | | | |
|---|---|---|---|
| 3,631,617 | 1/1972 | Pekko | 283/108 |
| 3,640,009 | 2/1972 | Komiyama | 283/75 |
| 3,864,855 | 2/1975 | Pekko et al. | 427/7 |
| 4,017,994 | 4/1977 | Fraser | 283/108 |
| 4,070,774 | 1/1978 | Staats et al. | 283/108 |
| 4,126,373 | 11/1979 | Moraw | 283/75 |
| 4,175,775 | 11/1979 | Kruegle | 283/91 |
| 4,184,701 | 1/1980 | Franklin et al. | 283/108 |
| 4,298,440 | 11/1981 | Hood | 422/907 |
| 4,359,633 | 11/1982 | Bianco | 235/468 |
| 4,525,416 | 6/1985 | Hammerschmidt et al. | 283/108 |
| 4,576,439 | 3/1986 | Gale et al. | 283/91 |

FOREIGN PATENT DOCUMENTS

| | | | |
|---|---|---|---|
| 1016210 | 8/1977 | Canada | 283/81 |

OTHER PUBLICATIONS

Webster's New International Dictionary, Second Edition, Unabridged, "coating", p. 512 1939.

*Primary Examiner*—Michael J. Carone
*Attorney, Agent, or Firm*—Samuels, Gauthier, Stevens & Reppert

[57] ABSTRACT

A tamper resistant label having a film to which non-adherent and visible indicia are applied. The film, with the non-adherent visible indicia is thereafter corona treated, and a layer of the same material or a material with the same index of refraction as the non-adherent visible indicia is applied, overlying the film. In this arrangement, any removal of the film does not affect the visible indicia, but the region in the vicinity of the visible indicia is destroyed. The non-adherent visible indicia may take the form of any predetermined pattern such as the term void to indicate to a viewer that the overlying protective film has been removed.

25 Claims, 2 Drawing Sheets

TAMPER RESISTANT LABELING

This is a continuation of application Ser. No. 07/875,552 filed on Apr. 24, 1992, abandoned which is file wrapper continuation of Ser. No. 07/162,239 filed Feb. 29, 1988, now abandoned, which is a divisional application of Ser. No. 06/941,998 filed Dec. 15, 1986, now abandoned.

BACKGROUND OF THE INVENTION

This invention relates to tamper-resistant labeling, particularly for permanent application to a substrate.

Many labels are required to remain in place and be legible for the life of the labelled item. Such labels should not be easily transferable to another item. To prevent easy transferability the label should be essentially tamper-resistant.

SUMMARY OF THE INVENTION

According to the invention, a two component tamper-resistant label is provided in which, after application of the label to a substrate, removal of a protective film will damage the underlying label.

The first component is a patterned layer in direct or indirect contact with an adhesive layer, typically pressure sensitive. The bond of the adhesive layer to a substrate, for the label, may exceed the tear strength of the patterned layer. The second component is a protective film over the patterned label layer.

At least a portion of the protective film preferably has substantially no adhesion to the patterned layer. This allows the protective film to readily separate from and destruct portions of the patterned layer when the film is removed.

In application, the patterned layer is directly or indirectly applied to a substrate. When the protective film is removed, the adhered portions will separate and cause the protective destruction of the patterned layer. In addition, any attempt to simultaneously remove both the protective film and the patterned layer will result, generally, in damage to the patterned layer.

In a preferred construction when the protective film is removed, there is removed with it some portion of the surface of the label, thus disrupting its visual indicia.

In accordance with another aspect of the invention, the protective film has non-adherent and visible indicia applied to it. The film, with the non-adherent visible indicia, is then corona treated. After corona treatment, a layer of the same material as the non-adherent visible indicia is applied, overlying the film. In this arrangement, any removal of the film will not affect the visible indicia, but the region in the vicinity of the visible indicia will be destroyed. The non-adherent visible indicia may take the form of the patterned "void" to a viewer that the overlying protective film has been removed, independently of the destructed areas adjoining the void indication. Thus, two indications of tampering are present, the indicia which bear an indicator pattern such as "void" and the adjoining regions which have been destroyed or altered.

In accordance with a further aspect of the invention the further coating that is applied to the non-adherent visible indicia on the film, and constituted of the same material as the non-adherent visible indicia, has the same refractive index as the indicia. This prevents the non-adherent visible indicia from being visible when the label is intact and allows the visibility of the indicia to become effective only when the protective film has been removed.

DESCRITION OF THE DRAWINGS

DETAILED DESCRIPTION

According to the invention, a tamper-resistant label system includes an embossable label base and an overlying protective film. The base is fragile and in a preferred construction, at least a portion is masked with a substance which has a patterned adhesion to the protective film After both the label base and the protective film are applied in adhesive contact with the substrate, removal of the protective film will expose the label base which cannot be removed without destruction. This is because the base has a lower tear strength than the adhesion to the substrate.

Figure 1:
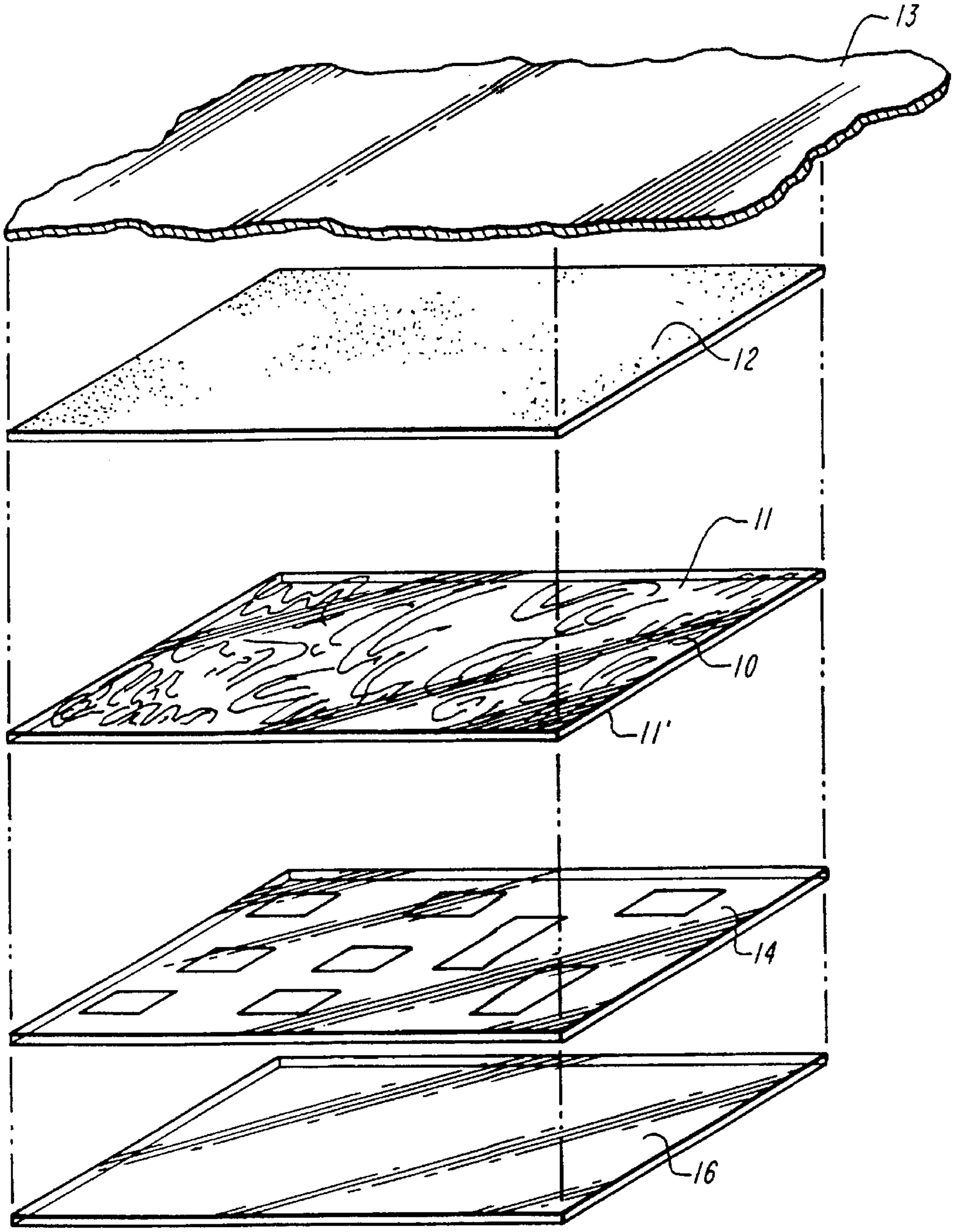
FIG. 1 is an expanded illustration of the several elements of the preferred label construction of the invention.

With reference to FIG. 1, the preferred label system of the invention is formed by an embossable base 10 and adhesive layer 12 which is adhesive both with respect to the lower surface 11 of the base 10 and the substrate 13 to which the label is to be applied.

The nature of the lower surface 11 is not narrowly critical although its tear strength must be less either than the cohesive strength of adhesive layer 12 or its adhesion to the substrate to which it is to be applied. It may, for instance, be a friable surface such as an adhesive layer, or a microspherical particulate surface which will yield visual indicia when struck with a force sufficient to rupture indicia-producing microspheres and the like.

It may also be a brittle surface such as a thin unplasticized vinyl polymer; an acrylic polymer; a thin epoxy polymer layer or the like. The surface must, however, have sufficient integrity to accept visual indicia formed by embossed or other printing techniques.

Label base 10 may be transparent or opaque, natural, colored or tinted.

Preferably, over at least a portion of the upper surface 11 of label base 10 there is applied a patterned or mask layer 14 of a substance having regions with little or no adhesivity to the overlying film 16. Any pattern may be applied. It may completely cover label base 10. Useful mask materials include various adhesives such as nitrocellulose with a minority amount of polyester rosin; sprayed film-forming coatings, such as Teflon; self-supporting films, such as a polyethylene film, which has limited or no adhesivity to the label base and/or the adhesive of protective film; and the like.

As indicated, the second component of the system is a protective film 16 which is in contact with the base 10 and is substantially nonadhesive with respect to portions of the mask 14.

The film 16 may be constructed of a variety of materials. Desirably, it has strong resistance to the elements to provide long term protection for base 10 and any visual indicia thereon.

Among the materials which may be used, for the protective film 16, are polymers such as ethylene polymers including polyethylene; propylene polymers including polypropylene, acrylic polymers; vinyl polymers including polyvinyl acetate, polyvinyl chloride, polyvinyl fluoride and the like;

cellulose acetate; polycarbonates; polyesters; polyethers; polysulfones, styrene polymers and the like.

The film 16 must be transparent where visual indicia are applied to base 10 but may be colored, tinted or printed as desired.

Although the mask 14 may be applied or in contact with the base 10 it may, in addition, be applied to the film 16. It may be applied as a coating or a self-supporting porous film having good adhesion to the film 16 but poor or no adhesion to the base 10. It may also be conveniently provided by selectively coating film 16 using a masking pattern during maufacture to make a portions of its surface void. In this situation the film 16 should be indexed, as with marking bars to indicate proper positioning with respect to the base 10.

Preferably, however, the relatively nonadhesive mask 14 is applied over all or part of the base 10. Where the surface of the base 10 has been provided with contrast colored coating, which is fragile or provided with fragile visual indicia, it is preferred to utilize only a limited mask. In this arrangement the protective film 16 may be provided with an adhesive surface which has some affinity for the color coating and/or the surface of the base 10. Removal of the applied film will then result in removal of part of the surface unprotected by the mask 14, providing random surface disruptions which will hinder reuse of the base by applying another protective film. In addition, replacement of the original film is hindered as proper alignment would be difficult.

The tamper-resistant label system of the invention may be provided for application to a substrate as a single composite, dual component system. A base 10 with an adhesive layer 12 may have, for example, any desired indicia and the protective film 16 applied immediately thereon using a release coated base as an initial support prior to application to a substrate. When used, both adhesive base label and protective overlayer may be applied directly as a unit to the substrate. A composite such as this is particularly useful for applications where indicia are to be applied later. The system is also useful where image forming microspheres are applied at the base. In this instance the visual indicia may be formed directly within the composite assembly on the self-supporting film 16.

Where, however, the label must bear indicia which are critical to identifying the substrate to which it is applied, the label system is conveniently provided as a two component system, the first component having essentially a label base 10 with an adhesive surface 12, preferably pressure sensitve, protected by a release (not shown) and mask 14. The second component is the protective film 16 which may also be initially protected by a release coated paper. The label base may be provided in a suitable manner with any desired standard visual indicia and later with indicia necessarily peculiar to the substrate to be labeled. After the label is applied with indicia peculiar to the substrate to which the label is to be applied, label base 10 is then attached to the substrate by thc adhesive layer 12.

Figure 3:
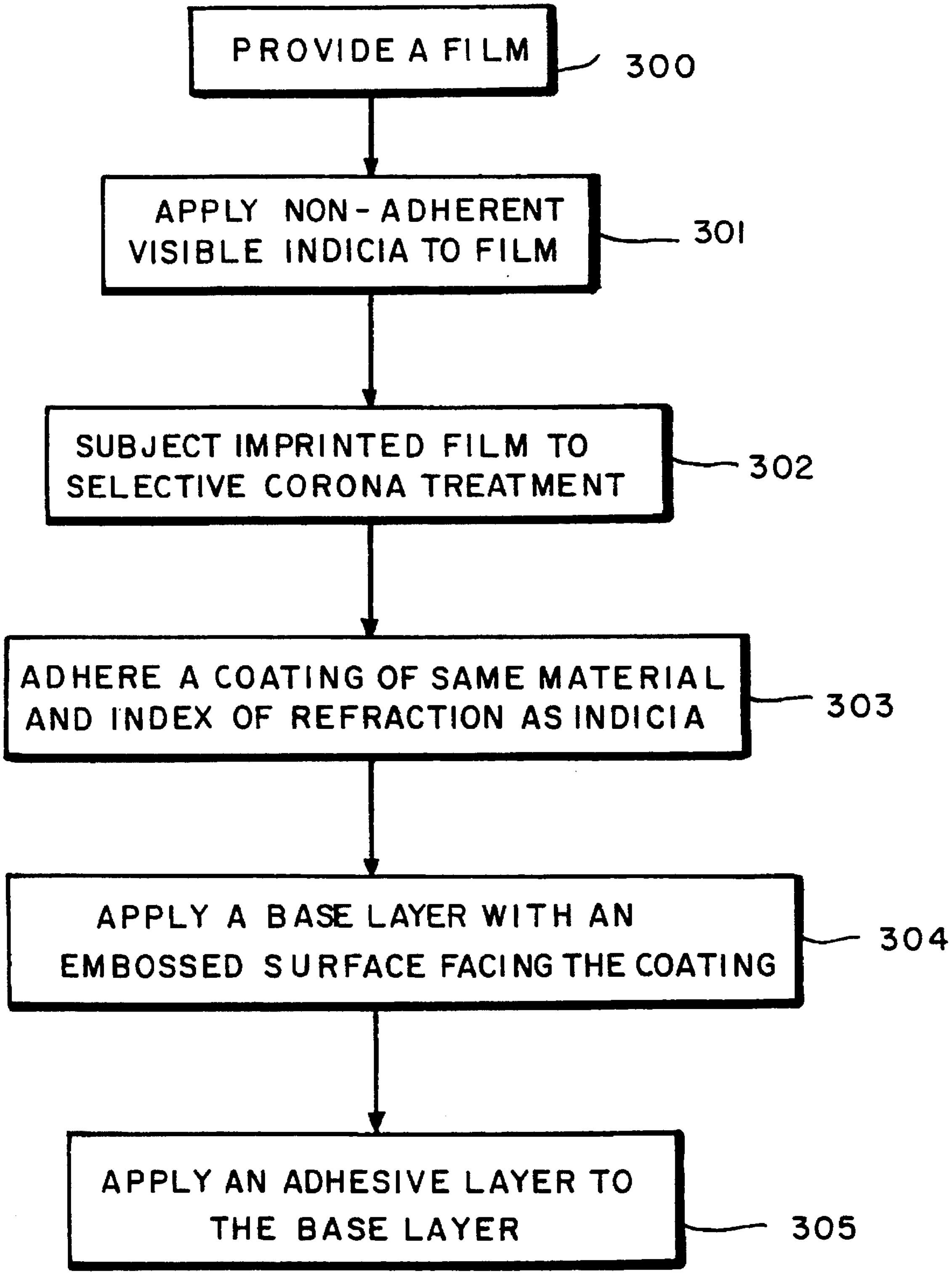
FIG. 3 is a flow chart showing the method steps of producing a label in accordance with the present invention.

With reference to the flow chart of FIG. 3, the method of producing a label in accordance with the present invention is shown.

The protective film 16 (step 300) may have mask 14 applied to it in the form of non-adherent visible indicia (step 301). In such a case, the mask 14 would include an imprint, for example containing the legend "void" on the protective film 16. Once the imprint has taken place, the imprinted film 16 is subjected to a corona treatment (step 302). Thereafter a layer of the same material as the imprint on the film 16 is applied over the entire layer 16 (step 303). Because of the corona treatment, any attempt to separate the film 16 from the rest the labeling structure, would result in the retention of the imprinted legend, for example "void" on the label structure. However, the remainder of the mask layer 14, because of the corona treatment that was applied after the imprinting of the film 16, would be destructed. Thus the legend "void" would be clearly visible on the remaining label structure but the surrounding areas would have been altered because of the adherence between the film 16 and the corona treatment that causes adherence to the remaining regions of the mask. It is to be noted that in order to prevent the imprinted legend on the film 16 from being visible in the composite labeling structure, the coating that is applied after the imprint, and after corona treatment of the imprint, is of the same material and has the same index of refraction as the imprint. In this way, the imprinted legend does not become visible until the overlying protective film has been removed and the legend remains adhered to the rest of the labeling structure. The embossable base layer 10 with an embossed surface is applied to the coating such that the embossed surface faces the coating (step 304), and then the adhesive layer 12 is applied to the embossable base (step 305).

Figure 2:
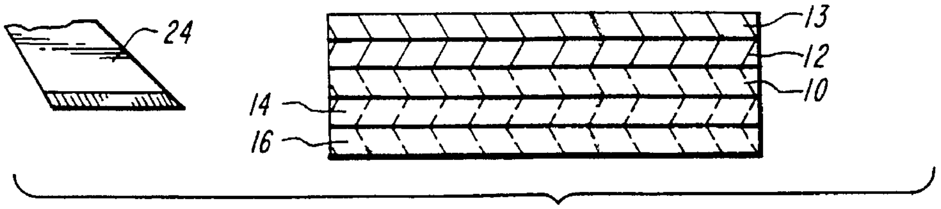
FIG. 2 is a sectional view of the preferred label construction of the invention.

With reference to FIG. 2, destruction occurs when an attempt is made to remove a label of the invention from the substrate 13 to which it is applied. As the transparent protective film 16 overlies the base 10, when it is removed there is removed with it a portion of the surface of the label base 10 along with a portion of the indicia. This disrupts the uniformity of the surface of label base 10 except in the areas where mask surface 14 appears. This gives a direct indication that the label surface now has two parts, a disrupted area and an undisrupted area and indicates tampering. This accomplishes two functions. First, as the transparent film 16 is lifted from label base 10 a portion of the surface on label base 10 in adhesive contact with the film 16 lifts and disrupts the uniformity of the label leaving a disrupted portion of the label and an undisrupted portion of the label that is protected by masking surface 14. The pattern of disruption is random making it nearly impossible to reapply the protective layer 16. Second, the label base 10 is exposed and will be damaged when an attempt is made to remove it.

With reference again to FIG. 2, when an attempt is then made to remove label base 10 from substrate 13 using a knife edge 24 the surface of label base 10 will destruct or become damaged and prevent transfer to another substrate.

When the film 16 is imprinted with a non-adherent visible indicia, such as the designation "void" the surface of the film 16 after the imprint is corona treated. Once the corona treatment has taken place, the remainder of the layer 14 is applied overlying the entire surface of the film 16, In this case, the patterned or masking layer 14 includes two distinctive constituents: an imprint upon the film 16 and a flood coating, occuring after corona treatment of the imprinted film 16, which overlies the entire imprinted film 16. The imprint in the layer 14 and the flood coat portion of the layer 14 desirably have the same index of refraction to prevent premature indication that the layer 14 contains a legend that indicates tampering, such as the designation "void".

If any attempt is made to simultaneously remove both the protective film and label base there is generally a buckling or separation of the label base from the protective self-supporting film.

What is claimed is:

1. A method of producing a coated label material, comprising the steps of:

providing a film;

applying a light transmitting layer as a predetermined indicia which is initially visible to selected areas of a surface of said film while allowing other areas of said surface to remain exposed; and adhering a continuous light transmitting coating to said layer and to the exposed areas of said surface, wherein said coating and said layer forming said indicia have indices of refraction which render said coating and said layer visually indiscernible with respect to one another.

2. The method of claim 1 further comprising the step of applying a layer of specified material to said coating to achieve a composite structure.

3. The method of claim 2, wherein an embossed surface is provided at the interface between said coating and said layer of specified material.

4. The method of claim 1, wherein said coating comprises the same material as said layer forming said indicia.

5. The method of claim 1, wherein said coating and said layer forming said indicia have the same indices of refraction.

6. The method of claim 1, wherein said step of adhering said coating includes the step of selectively corona treating at least said exposed areas of said film after applying said layer forming said indicia.

7. The method of claim 6, wherein said step of selectively corona treating includes the step of corona treating said layer forming said indicia.

8. The method of claim 6, wherein said step of selectively corona treating comprises the step of corona treating both said layer forming said indicia and said exposed areas of said surface of said film.

9. A method of producing a label structure comprising:

providing a film;

applying a light transmitting layer as a predetermined indicia which is initially visible to selected areas of a surface of said film while allowing other areas of said surface to remain exposed; and adhering a continuous light transmitting coating to said layer and to the exposed areas of said surface, said coating having a higher degree of adhesivity to said indicia and said film than the degree of adhesivity between said indicia and said film, wherein said coating and said layer forming said indicia have indices of refraction which render said coating and said layer visually indiscernible with respect to one another.

10. The method of claim 9, further comprising the steps of providing said coating with an embossed surface.

11. The method of claim 9 further comprising the step of applying adhesive to said embossed surface of said coating.

12. The method of claim 9, wherein said coating comprises the same material as said layer forming said indicia.

13. The method of claim 9, wherein said coating and said layer forming said indicia have the same indices of refraction.

14. The method of claim 9, wherein said step of adhering said coating comprises the step of selectively corona treating at least said exposed areas of said film after applying said layer forming said indicia.

15. The method of claim 14, wherein said step of selectively corona treating comprises the step of corona treating said layer forming said indicia.

16. The method of claim 14, wherein said step of selectively corona treating comprises the step of corona treating both said layer forming said indicia and said exposed areas of said surface of said film.

17. The method of claim 9, wherein said, layer forming said visible indicia is transparent.

18. A method of producing a label structure comprising:

providing a film;

applying a light transmitting layer as a predetermined indicia which is initially visible at first interfaces to selected areas of a surface of said film while allowing other areas of said surface to remain exposed; and adhering a continuous light transmitting coating to said layer at second interfaces and to the exposed areas of said surface at third interfaces, the adhesivity at said interfaces being non-uniform and resulting in surface disruptions of at least one of said interfaces in response to separation of said film from said coating, wherein said coating and said layer forming said indicia have indices of refraction which render said coating and said layer visually indiscernible with respect to one another.

19. The method of claim 18, further comprising the step of providing said coating with an embossed surface.

20. The method of claim 18, wherein said coating comprises the same material as said layer forming said indicia.

21. The method of claim 18, wherein said coating and said layer forming said indicia have the same indices of refraction.

22. The method of claim 18, wherein said step of adhering said coating comprises the step of selectively corona treating at least said exposed areas of said film after applying said layer forming said indicia.

23. The method of claim 22, wherein said step of selectively corona treating comprises the step of corona treating said layer forming said indicia.

24. The method of claim 22, wherein said step of selectively corona treating comprises the step of corona treating both said layer forming said indicia and said exposed areas of said surface of said film.

25. The method of claim 18, wherein said layer forming said visible indicia is transparent.

* * * * *